(No Model.) 2 Sheets—Sheet 2.

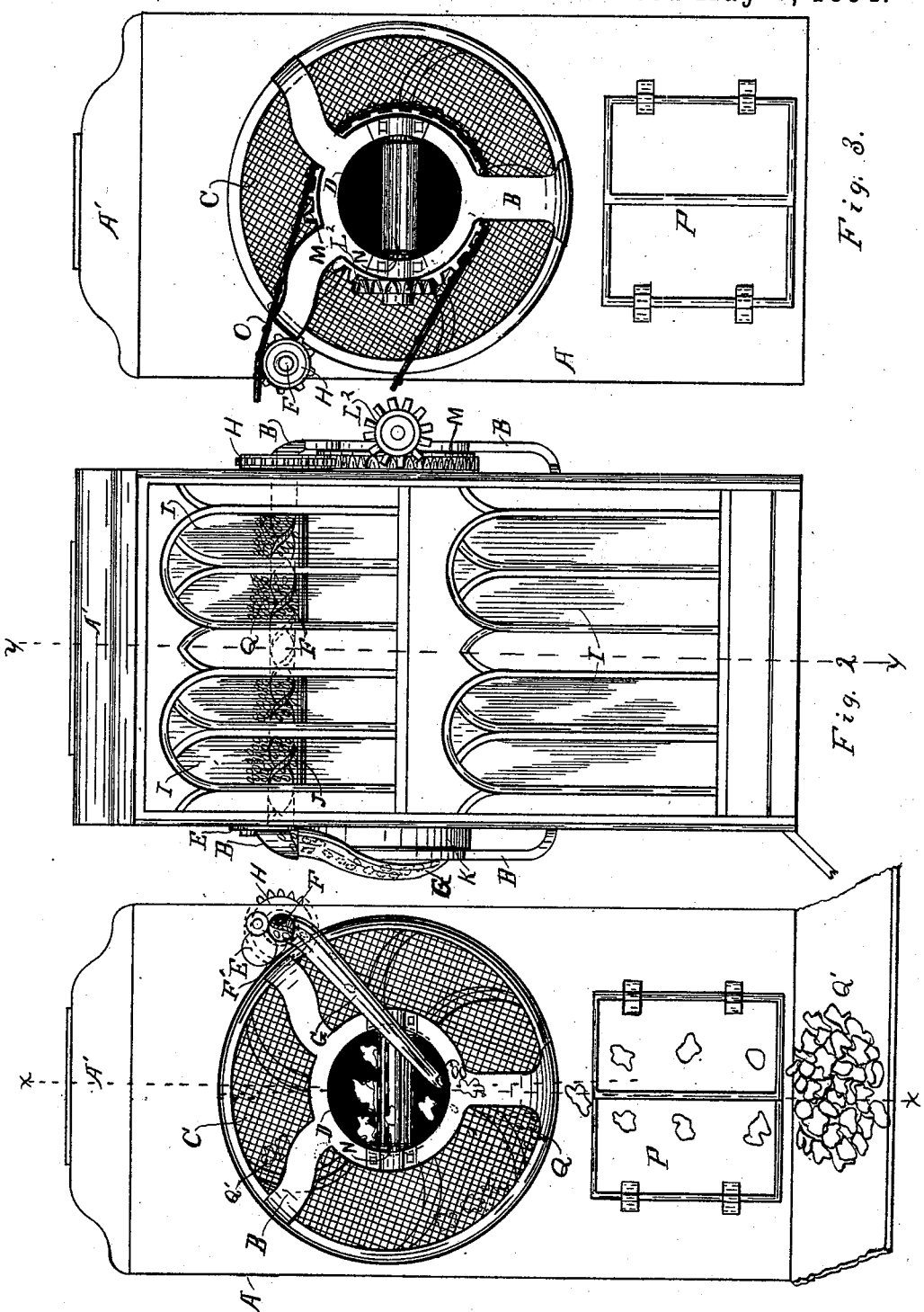

L. R. HIFFNER.
CORN POPPER.

No. 519,404. Patented May 8, 1894.

Witnesses:
Carl Cilley
H. A. Boardman

Inventor
Levi R. Hiffner
By Ithiel J. Cilley
Attorney.

UNITED STATES PATENT OFFICE.

LEVI R. HIFFNER, OF GRAND RAPIDS, MICHIGAN.

CORN-POPPER.

SPECIFICATION forming part of Letters Patent No. 519,404, dated May 8, 1894.

Application filed July 31, 1893. Serial No. 481,988. (No model.)

*To all whom it may concern:*

Be it known that I, LEVI R. HIFFNER, a citizen of the United States, residing at Grand Rapids, in the county of Kent and State of Michigan, have invented certain new and useful Improvements in Corn-Poppers, of which the following is a specification.

My invention relates to improvements in "power" corn poppers and its objects are: first, to provide a corn popper that will automatically feed in the shelled corn, separate the unpopped from the popped corn, and feed the corn out of the machine as fast as popped; and, second, to provide a corn popper from which the unpopped, or poor corn can be readily emptied when a batch has been wholly popped. I attain these results by the mechanism illustrated in the accompanying drawings, in which—

Figure 4:
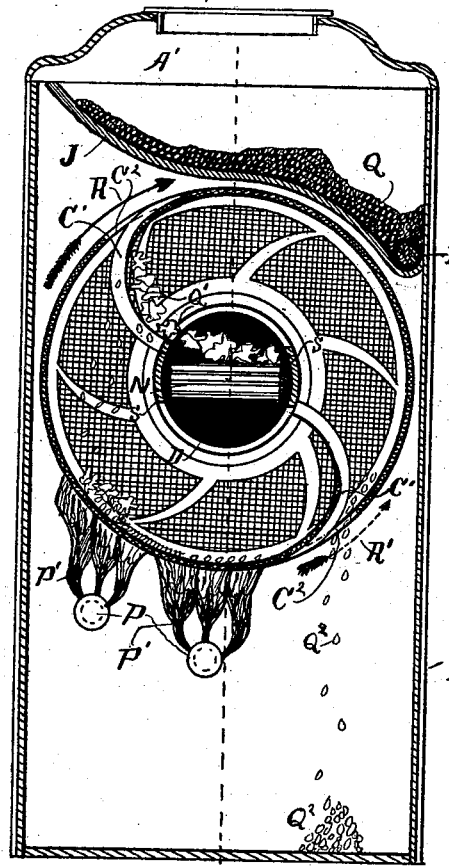
Figure 5:
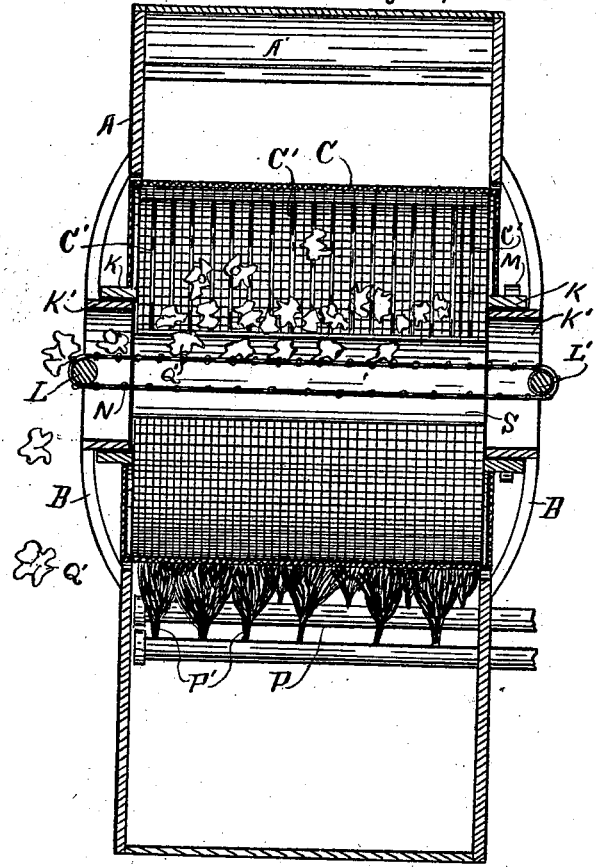

Figure 1. is a front elevation of my device. Fig. 2. is a side elevation of the same. Fig. 3. is a back elevation of the same. Fig. 4. is a vertical section of Fig. 1, on the line $y\ y$ of Fig. 2. Fig. 5 is a vertical section of Fig. 2. on the line $x\ x$ of Fig. 1, and Fig. 6. is an end view of the bearing that supports the cylinder showing antifriction rollers inserted.

Similar letters refer to similar parts throughout the several views.

Figure 6:
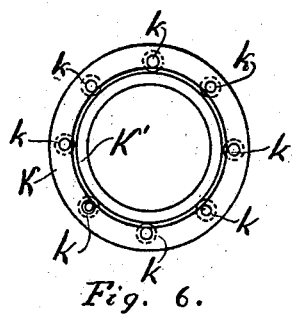

A represents the inclosing case, the sides of which I provide with windows I fitted with mica, or other suitable transparent material, so that the action of the corn within can be watched. The ends are open as shown in Figs. 1 and 3, and are provided with arms B that project outward and terminate in central annular bearings having bodies K' that project inward to the line of the outer surface of the ends of the case as indicated in Fig. 5, and are of a proper size to receive the end bearings K of the cylinder, outside, and form a free working bearing upon which the cylinder may be made to revolve. To facilitate the revolving of the cylinder upon the bearings I insert antifriction rollers $k$, as indicated in Fig. 6, between the two, so that their surfaces do not come in direct contact, thus reducing the friction to the minimum.

C is the cylinder, the ends,—to the bearings,— and the peripheries of which are covered with wire netting, the meshes of which are fine enough so that there is no liability, or possibility of the unpopped kernels of corn falling or working through. This cylinder, as hereinbefore suggested, is provided with outwardly projecting annular bearings K, by means of which it is supported and made to revolve upon the bearings K' on the frame, one of said bearings (K) being provided with sprockets M for the reception of a sprocket chain O, by means of which power is transmitted to revolve the cylinder, from any, desired, motor. This cylinder is provided with two sets of arms C', that run its entire length, and radiate from the line of the bearing K' to the peripheral netting; the arms in each series being of a proper distance apart so that all the unpopped kernels of corn will drop through and be again subjected to the influence of heat at the bottom of the cylinder, while the "popped" kernels are carried over, and are discharged upon the carrier or transfer mechanism N, (to be hereinafter more fully described) as shown in Figs. 4 and 5, and suggested in Fig. 1, when the cylinder is being revolved forward, or in the direction indicated by the arrow R. To provide for emptying the waste kernels of corn out of this cylinder, when a "batch" has been popped, I leave an open space $C^2$ between the edges of the peripheral netting and the back of each series of arms, as shown in Fig. 4, and to empty the corn I turn the cylinder backward, or in the direction indicated by the broken arrow R' which allows the kernels to drop back through these openings and into the bottom of the inclosing frame as at $Q^2$. The corn may be popped by means of a gas jet as P' from pipes P, or by any other means of generating the desired amount of heat.

To feed the corn (Q. Fig. 4.) to the cylinder I provide a storage chamber in the inclosing case above the cylinder with its lower wall J so inclined that the corn will gravitate to one side of the inclosing case, well down below the top of the cylinder; where I place a worm or screw feed F, one end of which passes out of the back wall of the case, and is provided with a sprocket wheel H, by means of which a rotary motion is transmitted to the feed worm from the driving chain O, and at the opposite, or front end of the feed worm I provide a small opening F'. through the front wall of the case, and fit it with a trap door E with which to regulate the outflow of the corn. Immediately below this opening I place a tube, G, the upper end of which is in position to receive the kernels of corn as fast as they are dropped from the opening F'; while the lower end passes through the opening D in the annular bearing K' of the case, as at g—Figs. 1 and 2—so as to drop the kernels of corn into the cylinder, gradually,—as indicated at Q in Fig. 1.,—ahead of the approaching arms; the outer or peripheral netting of the cylinder being carried down on these arms far enough to avert all danger of the corn dropping through the openings C² back of the arms when the cylinder is revolving in the direction indicated at R, and to positively insure its passage through said openings when the cylinder is revolving in the opposite direction,—(indicated at R'.)

To transfer the assorted popped corn from the cylinder, I provide, first, the series of radial arms C' hereinbefore described; second, two side plates S extending the entire length of the case and attached at the ends, solidly, to the bearings K' so that the, inner, end support of the arms C' will travel near enough to their outer surface to avert all danger of the popped kernels dropping through between them and back into the cylinder (see Fig. 4) and wide enough to extend a short distance above and below the chain N; the center of the cylinder above and below said chain being left entirely open for the free passage of the corn; third, the transfer chain N, the links of which are set at a proper distance apart to allow any unpopped kernels that may drop thereon, to pass through and back into the cylinder; while the popped corn will be supported, carried and dropped outside of the case as indicated in Figs. 1 and 5. This chain is supported and driven upon the shafts L and L', located respectively at the front and back ends of the case so that the chain passes entirely through the center of the cylinder; the shaft L' being provided with a toothed gear wheel L² which is at right angles, and is made to mesh freely with the sprocket wheel M so that the revolving of the cylinder C causes the shaft L' to revolve, and with it the chain is forced to travel around the shaft or idler L in a proper direction to carry the corn out of the front end of the case.

The top A' may be made to be opened or closed at pleasure, and to provide access to the inside of the case below the cylinder I place doors P at one, or both ends thereof.

The storing of the corn in the chamber over the cylinder is not merely for the purpose of providing a storage chamber within the inclosing case, but for the further purpose of subjecting the corn to a sufficient degree of heat, prior to popping, to insure as nearly a perfectly dry kernel when it enters the cylinder as is practicable, without actually popping the corn, by which means I am not only able to pop the corn with a lower degree of heat, and thus avert much of the danger of burning the corn, but am insured a much larger percentage of popped kernels, and much more fleecy and palatable than where the corn is fed into the cylinder cold and brought into the direct influence of the heat.

Having thus fully described my invention, what I claim as new, and desire to secure by Letters Patent of the United States, is—

1. The combination, in a corn popper, of an outer inclosing case having open ends and annular central bearings, a perforated cylinder supported to revolve upon said bearings the ends of said cylinder being open through said bearings, an endless chain for conveying the popped corn out through said openings, an idler across one end of said case and a driving shaft across the other end thereof to support and drive said endless chain through the center of said cylinder and guards at each edge of said chain and a heating appliance, substantially as, and for the purpose set forth.

2. The combination, in a corn popper, of an outer inclosing case having the ends open and provided with annular bearings for the support of the popping cylinder, a perforated popping cylinder within said case, having annular bearings corresponding with the bearings on the case the space within said annular bearings being open, a storage chamber in the case above said cylinder, a feed worm in said chamber, an opening in the front wall of the case for the discharge of corn, a conveyer therefrom to the center of the cylinder, a conveyer through the center of the cylinder lengthwise to convey the popped corn therefrom, mechanism for driving said cylinder, conveyer and feed worm, and a heating appliance, substantially as, and for the purpose set forth.

3. In a corn popper, an outer inclosing case, a cylinder within said case, assorting arms within said cylinder and wire netting around its periphery, an annular bearing at each end of the cylinder, one of said bearings passing through the end of the inclosing case and provided with a sprocket wheel, a shaft across the end of the case, a sprocket wheel on said shaft, an idler shaft across the opposite end of the case, an endless chain supported on said shafts and driven, thereby, through the center of the cylinder and a guard through the cylinder at each edge of the chain, and a heating appliance substantially as shown and described.

4. The combination, in a corn popper, of an inclosing case having open ends and annular bearings, a cylinder having annular bearings corresponding therewith, anti-friction rollers in said bearings, guards passing through said cylinder and attached at the ends to the sides of the annular bearings in the case, assorting arms within the cylinder, the peripheral covering of the cylinder extending well down on the front of said arms and provided with a narrow opening back of them, a storage chamber in the case above the cylinder, a feed worm therein, an opening in the case at the front end of said feed worm, a conducting tube thence into the center of the cylinder, a conveyer for conveying the popped corn out at the center of the end of the cylinder and case mechanism for driving the cylinder, the feed screw, and the conveyer, and a heater, substantially as specified and shown.

5. In a corn popper, an outer inclosing case, arms projecting from each end of said case and terminating in inwardly projecting annular rims, a revoluble cylinder within said case having annular bearings at the ends to co-operate with, and travel around the annular rims of the outer case, anti-friction rollers between said bearings, one of the annular bearings on the cylinder being provided with sprockets a shaft supported across the back end of the outer frame and provided with a sprocket—or a bevel gear—to mesh at right angles with the cylinder sprocket and a corresponding idler supported across the front end of the outer frame, an endless chain supported upon, and driven by said shaft and idler, guards at each side of said chain passing through the center of the cylinder and secured at the ends to the annular rims of the outer case, and open above and below the chain for the free passage of corn, assorting arms projecting from the periphery of the cylinder to, and supported near the outer surface of said guards, a perforated cover extending well down from the outer ends of each set of arms around the periphery of the cylinder to near the back of the other set and leaving an opening back of each set of arms, a storage chamber and feed screw in the top of the outer case, a sprocket chain for transmitting power to drive the cylinder, and appliances for heating the same, substantially as shown and described.

Signed at Grand Rapids, Michigan, this 24th day of July, 1893.

LEVI R. HIFFNER.

In presence of—
ITHIEL J. CILLEY,
GEORGE H. WHITE.